(12) United States Patent
Durney

(10) Patent No.: US 10,220,540 B1
(45) Date of Patent: Mar. 5, 2019

(54) ADJUSTABLE POCKET-CUTTING DEVICE

(71) Applicant: Max W. Durney, Petaluma, CA (US)

(72) Inventor: Max W. Durney, Petaluma, CA (US)

(*) Notice: Subject to any disclaimer, the term of this patent is extended or adjusted under 35 U.S.C. 154(b) by 0 days.

(21) Appl. No.: 15/941,857

(22) Filed: Mar. 30, 2018

Related U.S. Application Data

(60) Provisional application No. 62/478,953, filed on Mar. 30, 2017.

(51) Int. Cl.
*B27C 5/06* (2006.01)
*B27C 9/00* (2006.01)
*B27C 5/10* (2006.01)
*B23B 51/00* (2006.01)

(52) U.S. Cl.
CPC .............. *B27C 5/06* (2013.01); *B27C 5/10* (2013.01); *B27C 9/00* (2013.01); *B23B 51/0054* (2013.01); *B23B 2270/34* (2013.01)

(58) Field of Classification Search
CPC .... B27C 5/06; B27C 5/10; B23C 1/00; B23C 1/12; B23C 1/14; B23Q 9/0014; B23Q 9/0021; B23Q 9/0028; B23Q 9/0035; B23Q 9/0042; B23Q 9/005; B23Q 9/0057; B23Q 9/0064; B23Q 9/0071; B23Q 9/0078; B23Q 9/0085; B23Q 9/0092; B23Q 9/02; B27F 5/02; B27F 5/12; Y10T 408/352
See application file for complete search history.

(56) References Cited

U.S. PATENT DOCUMENTS

| 4,603,719 | A | | 8/1986 | Durney | |
|---|---|---|---|---|---|
| 5,063,982 | A | | 11/1991 | Durney | |
| 5,375,636 | A | * | 12/1994 | Bosten | B23Q 9/0092 144/136.1 |
| 5,553,645 | A | | 9/1996 | Durney | |
| 5,667,000 | A | * | 9/1997 | Bean | B23Q 9/0014 144/136.7 |
| 6,877,536 | B2 | | 4/2005 | Durney | |
| 9,403,285 | B2 | | 8/2016 | Durney | |

* cited by examiner

*Primary Examiner* — Matthew G Katcoff
(74) *Attorney, Agent, or Firm* — Santa Fe IP, LLC

(57) ABSTRACT

An adjustable pocket-cutting device includes a body, a router, an actuation lever assembly, and a stop lever assembly. The actuation lever assembly includes an actuation lever pivotally mounted on the housing at an actuation lever pivot, a router mount, and pivots from a retracted position to a deployed position. The stop lever assembly adjustably limits the sweep of the router bit into the work clamped to the worktop and includes a stop lever adjustably mounted to the housing, a stop pin extending through a clearance opening in the housing and across a thickness of the actuation lever such that it abuts against an abutment surface of the actuation lever to limit the sweep of the router bit as the router assembly pivots to the deployed position. A method of using the adjustable pocket-cutting device is also disclosed.

18 Claims, 16 Drawing Sheets

ADJUSTABLE POCKET-CUTTING DEVICE

BACKGROUND OF INVENTION

Field of Invention

This application relates, in general, to adjustable pocket-cutting devices and more particularly to devices that include adjustable stops and guides to vary web thickness and position bores, respectively, and methods for their use.

Description of Related Art

Many cabinet and furniture products are formed from a plurality of wooden, composite or plastic members which are joined together by various fasteners, most usually wood screws. In many instances, the wood screws are positioned in screw pockets or mortises formed in the joinery member adjacent to an edge of the member, which edge is then secured to a second joinery member. For example, and with reference to FIG. 3, a joinery member 30 may be provided with screw pockets 32 with corresponding screw bores 33 which are dimensioned to receive wood screws therein in such a manner that the joinery member may be screwed and secured to an abutting second joinery member by the wood screws.

The formation of screw pockets can be accomplished using various types of equipment. Some of the most efficient ways of forming screw pockets and complementary bores are set forth in my prior U.S. Pat. Nos. 9,403,285, 6,877,536, 5,553,645, 5,063,982 and 4,603,719, the entire contents of which is incorporated herein for all purposes by this reference.

Woodworking is increasingly popular with weekend hobbyists and the so called "prosumers", that is, amateurs who purchase equipment with quality or features suitable for professional use. Woodworking equipment may run into the thousands, ten-thousands, or even hundred-thousands of dollars, and may thus be cost prohibitive even for prosumers. In addition, weekend hobbyists and prosumers may be limited to working in their garages or other small dedicated woodshops. Accordingly, space is often at a premium, and the footprint of certain equipment dedicated to specific tasks may be excessively large for the close quarters available to many hobbyists and prosumers.

In light of the foregoing, it would be beneficial to have pocket-cutting devices including the features and advantages of heavy-duty woodworking equipment, while overcoming the above and other disadvantages of known pocket-cutting equipment.

BRIEF SUMMARY

One aspect of the present invention is directed to an adjustable pocket-cutting device for routing a pocket in a workpiece including: a body having a housing pivotally supporting a router assembly, a worktop mounted on the body for supporting the workpiece, wherein the housing haves an edge stop for receiving an edge of the workpiece to position the workpiece on the worktop; a router assembly having a router having a router bit for routing the pocket in the workpiece positioned on the worktop; an actuation lever assembly having an actuation lever pivotally mounted on the housing at an actuation lever pivot, the actuation lever haves a router mount for supporting the router thereon, wherein the router bit sweeps through a slot in the worktop and into the work piece clamped against the worktop as the router assembly pivots from a retracted position to a deployed position; and stop lever assembly for adjustably limiting the sweep of the router bit into the work clamped to the worktop, the stop lever assembly having a stop lever adjustably mounted to the housing at a stop lever pivot, a stop pin extending from the stop lever through a clearance opening in the housing and across a thickness of the actuation lever, wherein the stop pin abuts against an abutment surface of the actuation lever to limit the sweep of the router bit as the router assembly pivots to the deployed position.

The adjustable pocket-cutting device may further include a work clamp assembly for clamping the workpiece against the worktop when positioned on the worktop.

The work clamp assembly may include a clamp frame that is movable with respect to the housing, and a cam lever that is pivotally mounted on the housing. The cam lever biases the clamp frame toward the workpiece supported on the worktop when in an engaged position, and the cam lever releases the clamp frame from the workpiece when in a released position.

The stop lever assembly may further include a fastener for adjustably securing the stop lever relative to the housing.

The stop lever assembly may further include pivoting indicia and the housing may include stationary indicia to facilitate alignment of the stop lever relative to the housing to accurately limit the sweep of the router bit.

The adjustable pocket-cutting device may further include a drill guide assembly for adjustably aligning a drill bit path relative to the sweep of the router bit, the drill guide assembly having a support adjustably mounted to the housing, and a collar mounted on the support, the collar having a through bore for receiving and positioning a drill bit.

The drill guide assembly may further include a lock for adjustably securing the support to the housing.

The collar may be axially adjustable relative to the support.

The stop pin may extend from the stop lever through a clearance opening in the housing and into a travel slot of the actuation lever, wherein the stop pin abuts against a proximal end of the travel slot to limit the sweep of the router bit as the router assembly pivots to the deployed position.

Another aspect of the present invention is directed to an adjustable pocket-cutting device for routing a pocket in a workpiece includes: a body having a housing, a worktop mounted on the body for supporting the workpiece, wherein the housing haves an edge stop for receiving an edge of the workpiece to position the workpiece on the worktop; a router assembly having a router having a router bit for routing the pocket in the workpiece positioned on the worktop; an actuation lever assembly having an actuation lever pivotally mounted on the housing at an actuation lever pivot, the actuation lever haves a router mount for pivotally supporting a router assembly relative to the actuation lever pivot such that a router bit sweeps through a slot in the worktop and into a work piece clamped against the worktop as the router assembly pivots from a retracted position to a deployed position; and a stop lever assembly for adjustably limiting the sweep of the router bit into the work clamped to the worktop, the stop lever assembly having a stop lever adjustably mounted to the housing at a stop lever pivot, a stop pin extending from the stop lever through a clearance opening in the housing and into a travel slot of the actuation lever, wherein the stop pin abuts against a proximal end of the travel slot to limit the sweep of the router bit as the router assembly pivots to the deployed position.

The adjustable pocket-cutting device may further include a work clamp assembly for clamping the workpiece against the worktop when positioned on the worktop.

The work clamp assembly may include a clamp frame that is movable with respect to the housing, and a cam lever that is pivotally mounted on the housing. The cam lever biases the clamp frame toward the workpiece supported on the worktop when in an engaged position, and the cam lever releases the clamp frame from the workpiece when in a released position.

The stop lever assembly may further include a fastener for adjustably securing the stop lever relative to the housing.

The stop lever assembly may further include pivoting indicia and the housing may include stationary indicia to facilitate alignment of the stop lever relative to the housing to accurately limit the sweep of the router bit.

The adjustable pocket-cutting device may further include a drill guide assembly for adjustably aligning a drill bit path relative to the sweep of the router bit, the drill guide assembly having a support adjustably mounted to the housing, and a collar mounted on the support, the collar having a through bore for receiving and positioning a drill bit.

The drill guide assembly may further include a lock for adjustably securing the support to the housing.

The collar may be axially adjustable relative to the support.

The stop pin may extend from the stop lever through a clearance opening in the housing and into a travel slot of the actuation lever, wherein the stop pin abuts against a proximal end of the travel slot to limit the sweep of the router bit as the router assembly pivots to the deployed position.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
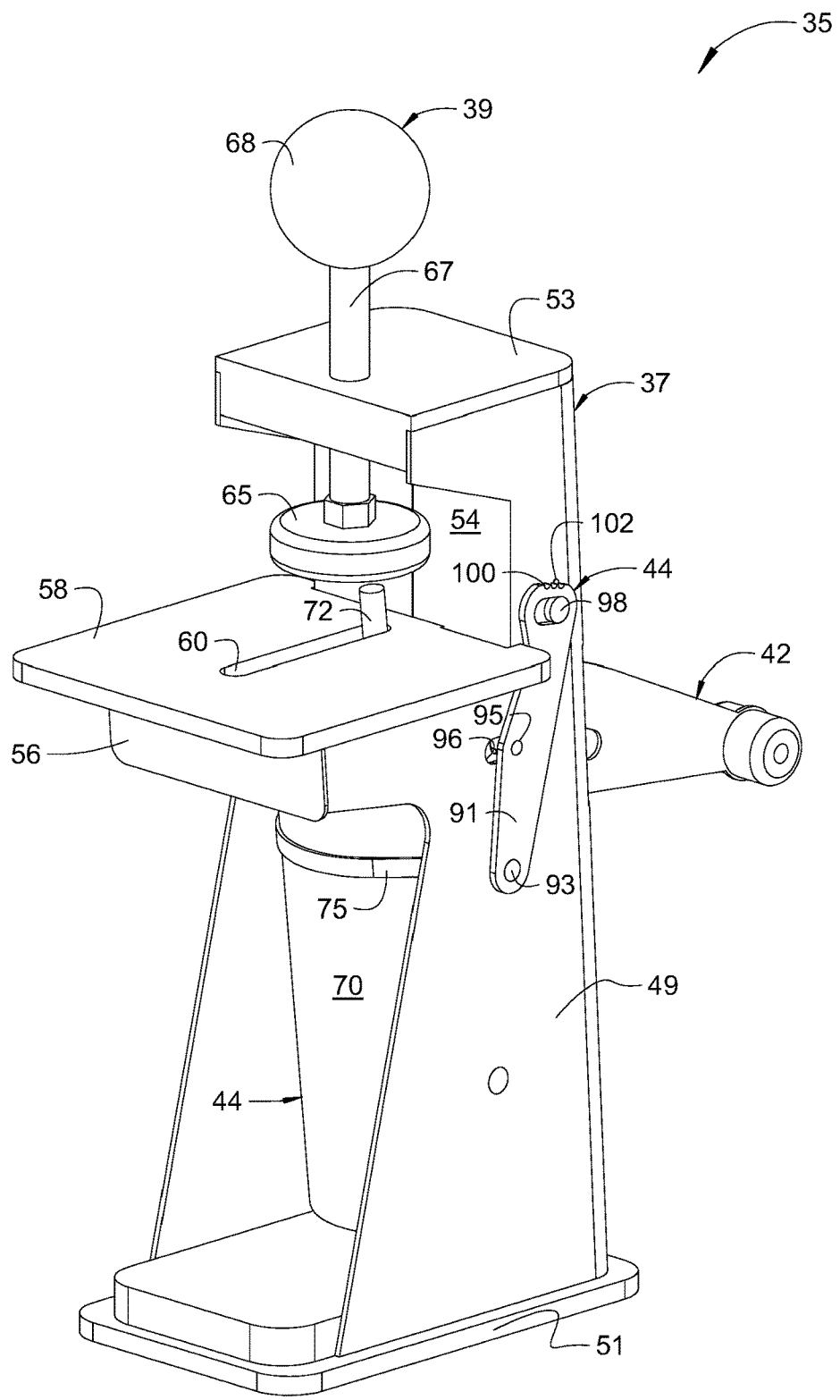
FIG. 1 is a perspective view of an exemplary adjustable pocket-cutting device in accordance with various aspects of the present invention.

Turning now to the drawings, wherein like components are designated by like reference numerals throughout the various figures, attention is directed to FIG. 1 which illustrates a pocket cutting device 35 in accordance with various aspects of the present invention.

Figure 2:
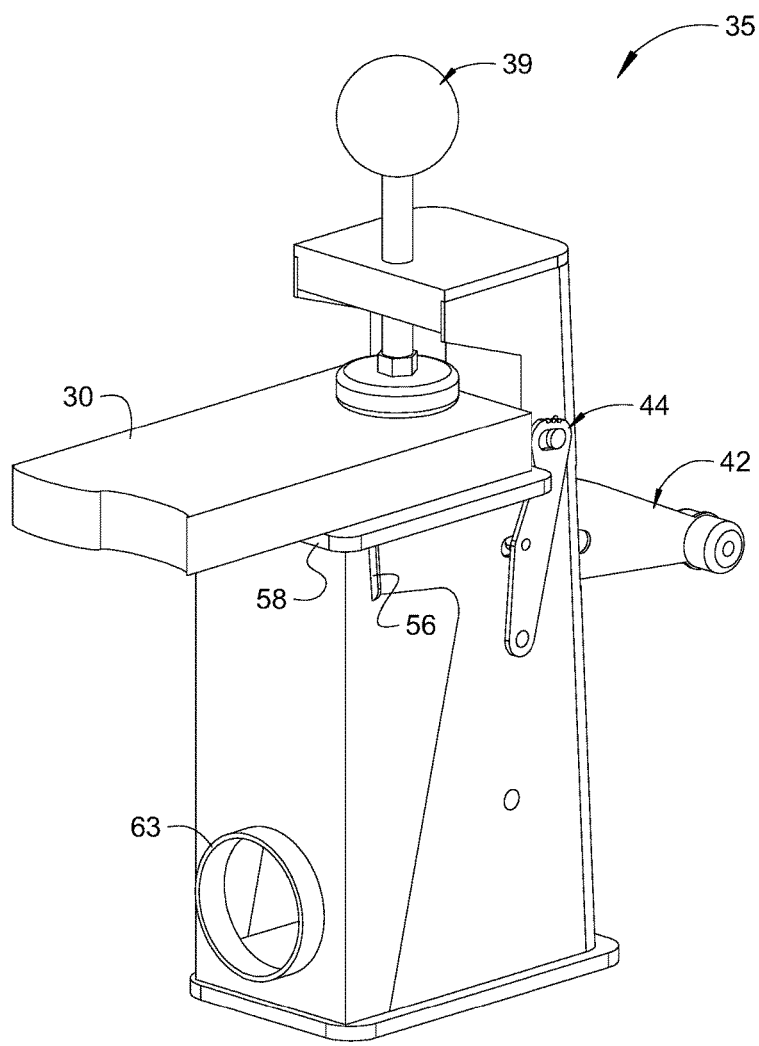
FIG. 2 is a perspective view of the device of FIG. 1 having an optional dust cover mounted, and having a workpiece clamped to a worktop, in accordance with various aspects of the present invention.

The pocket-cutting device generally includes a body assembly 37 for supporting the various components of the device, a work clamp assembly 39 for clamping down workpiece 30 (see FIG. 2), a router assembly 40 for routing pocket 32 (see FIG. 3) into the workpiece, an actuation lever assembly 42 for effecting movement of the router assembly to form the pocket, a stop lever assembly 44 for adjustably limiting movement of the router assembly to selectively adjust the distance of rounded pocket end 46 from the edge of the workpiece, and a drill guide assembly 47 (see FIG. 4) for adjustably positioning bore 33 (see FIG. 3) through the web.

The body assembly includes a housing 49 that is supported on a base 51 and is capped with a top 53. In various embodiments, the housing is sheet metal, cut and bent into shape. For example, the profile of the housing may be cut by laser or water-jet, and the housing bent into shape, including the flaps that form edge stop 54. For example, various metal-bending technologies may be utilized to precisely bend the housing, including but not limited to those discussed in my prior U.S. Pat. Nos. 6,481,259, 7,152,450, 7,222,511, 7,263,869, 7,350,390,7,350,390, 7,354,639, 7,354,639, and, 7,440,874, the entire contents of which is incorporated herein for all purposes by this reference. Alternatively, the profile and shape of the housing may be formed by stamping, molding, and/or other suitable fabrication means. In addition, the housing may be formed of other suitable materials, including but not limited to other metals, plastics, composites, and/or other suitable materials. The base and top may be formed of metals, plastics composites, phenolics, and/or other suitable materials that provide sufficient structural integrity to support the housing and various components therein. In various embodiments, the base and top are secured to the housing by screws, however, one will appreciate that other suitable means may be utilized.

Figure 5:
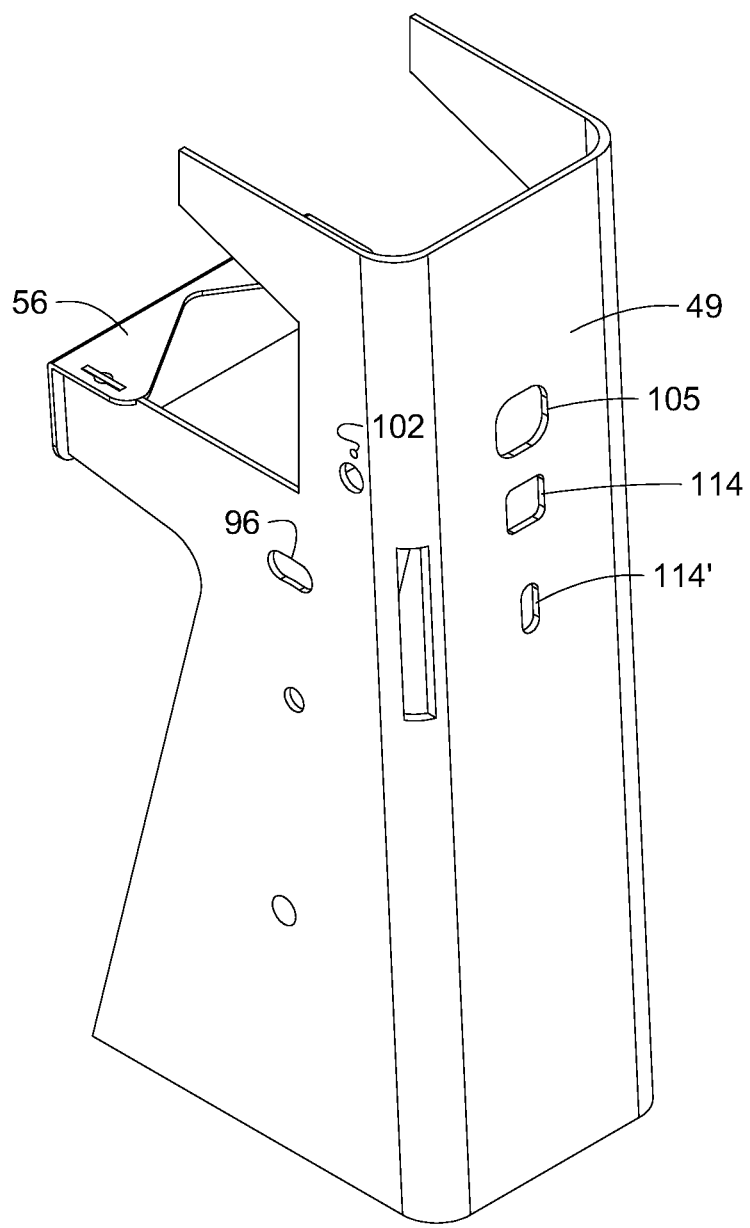
FIG. 5 is a rear perspective view of the housing of the device of FIG. 1, in accordance with various aspects of the present invention.
Figure 6:
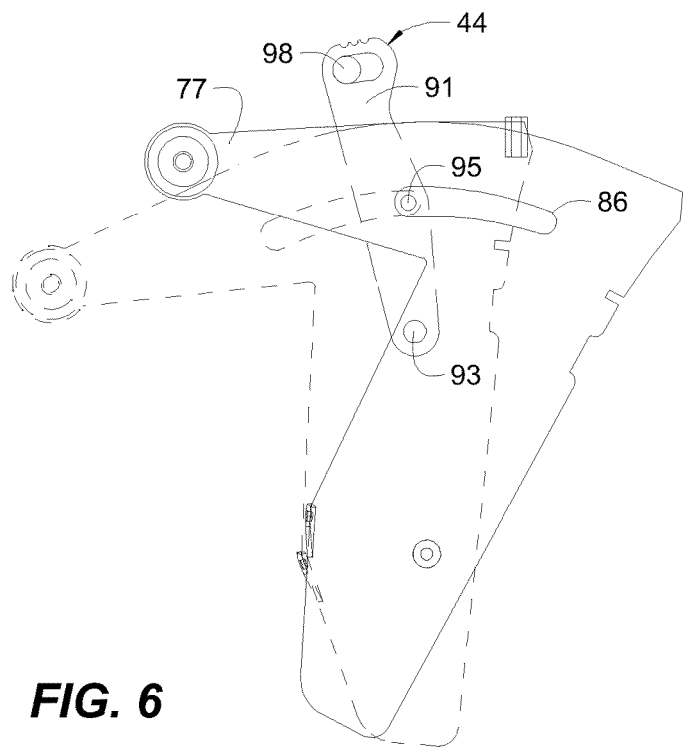
FIG. 6 is a side view of actuation and stop levers of the device of FIG. 1 with the actuation lever in a retracted position and in a deployed position shown in phantom, in accordance with various aspects of the present invention.

In various embodiments, housing 49 includes a removable deck support 56 as shown in FIG. 5. The deck support includes a slot that receives tabs on housing 49 such that the deck support may be readily installed or removed to facilitate both assembly and access to internal components such as the router assembly. In various embodiments, the deck support is also sheet metal, however, one will appreciate that it may be formed of other suitable materials, including but not limited to other metals, plastics, composites, and/or other suitable materials.

The body also includes a worktop 58 is mounted on the housing and provides a stable surface upon which workpiece 30 may be mounted during the routing process. The worktop includes a router bit slot 60 through which a router bit may extend while routing is performed on the workpiece.

Figure 3:
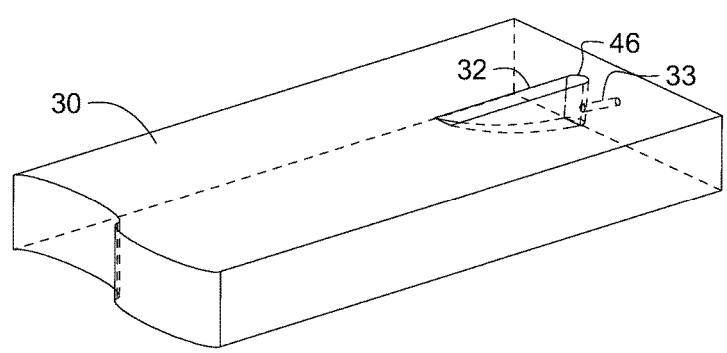
FIG. 3 is a bottom perspective view of the workpiece of FIG. 2.

In various embodiments, housing 49 may include a dust cover 61 having a dust collection port 63 as shown in FIG. 3. The dust cover substantially encloses the inside of the housing and thereby contains dust and particulate formed during the routing process. The dust collection port is dimensioned and configured to receive a dust collection hose of a dust collection system in an otherwise conventional manner.

With reference to FIG. 1, the work clamp assembly is mounted on top 53 and includes a clamp foot 65, a clamp actuator 67, and a clamp knob 68. In the illustrated embodiment, the clamp actuator is a threaded member having a lower end pivotably attached to the clamp foot and an upper end affixed to clamp knob. While shown as a threaded member threadedly extending through and axially adjustable relative to the top, one will appreciate that other clamping mechanisms may be utilized to secure workpiece 30 to worktop 53, including, but not limited to toggle clamps, C-clamps, and/or other suitable clamping means.

Figure 12:
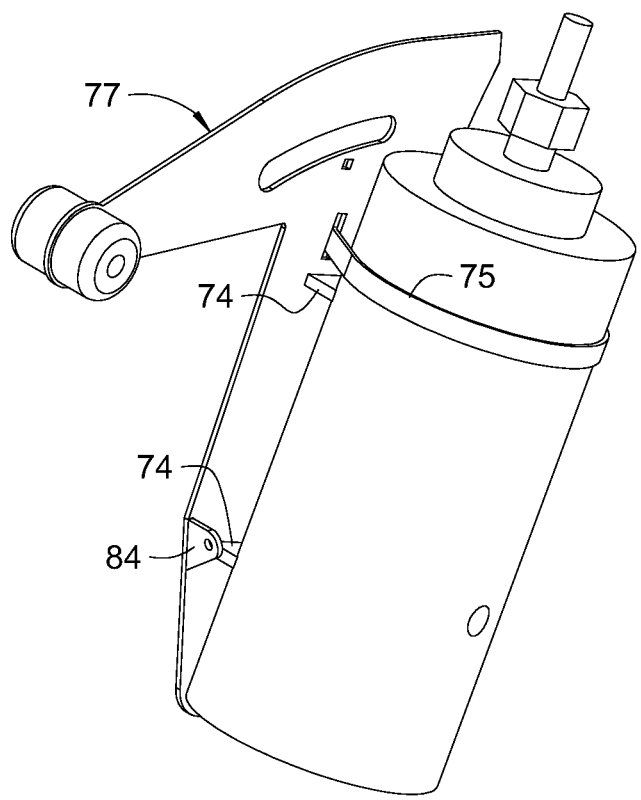
FIG. 12 is a side perspective view of the router assembly of the device of FIG. 1 mounted on the actuation lever, in accordance with various aspects of the present invention.
Figure 13:
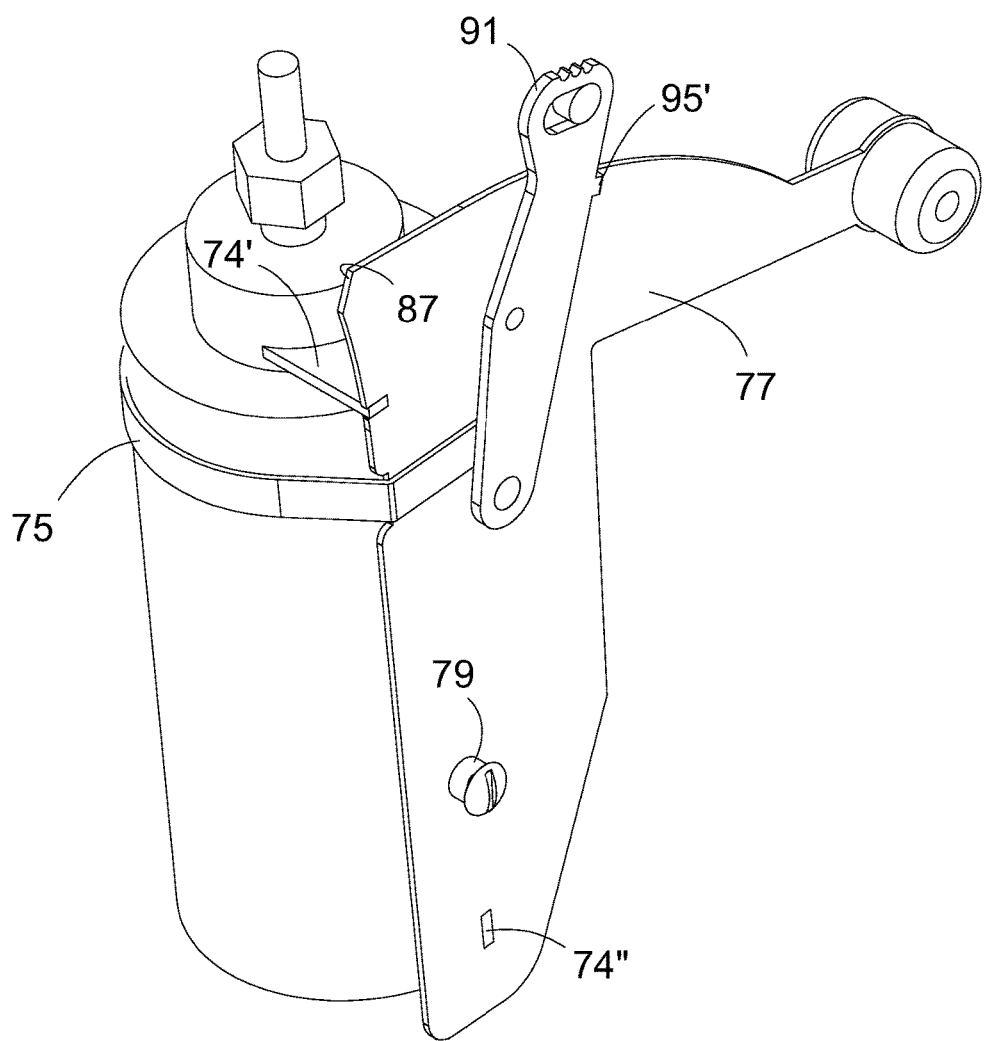
FIG. 13 is a side perspective view of the router assembly of the device of FIG. 1 mounted on another actuation lever, in accordance with various aspects of the present invention.

The router assembly generally includes a router 70 that drives a router bit 72 in an otherwise conventional manner. For example, a Bosch® variable-speed fixed-corded trim router may be utilized, in which case a base provided with the router may be removed from the router, and the router mounted to the actuation lever assembly, as discussed in greater detail below. The router is supported on the lever assembly by one or more router mounts. In various embodiments two one or more router mounts 74 may be provided on the actuation lever 77, in which each mount is a yoke having a semi-circular recess that closely matches the outer profile of router 70 (see FIG. 12). And in various embodiments, the upper mount may be a yoke 74' having a semi-circular recess closely matching the outer portion the router's bearing housing adjacent the router bit chuck, and the lower mount may be a tab 74" that is dimensioned and configured to be received by a vent opening or other recess or notch in router 70 (see FIG. 13). The upper yoke configuration serves to securely mount the router to the actuation lever and significantly reduce the moment arm and forces generated by the spinning router bit against the workpiece during a routing operation. Also, the lower tab configuration serves not only to securely mount the router to the actuation lever, but also to accurately register the position with respect to the assembly process.

Once in place, the router may be removably secured to the lever assembly by a router clamp 75. In various embodiments, the router clamp may be a conventional hose clamp encircling the router and extending through mounting notches and/or apertures provided on the actuation lever. However, one will appreciate that other suitable clamping mechanisms may be utilized such as bands having quick release mechanisms, clamping flanges affixed by wingnuts, and/or other suitable clamping means.

Figure 4:
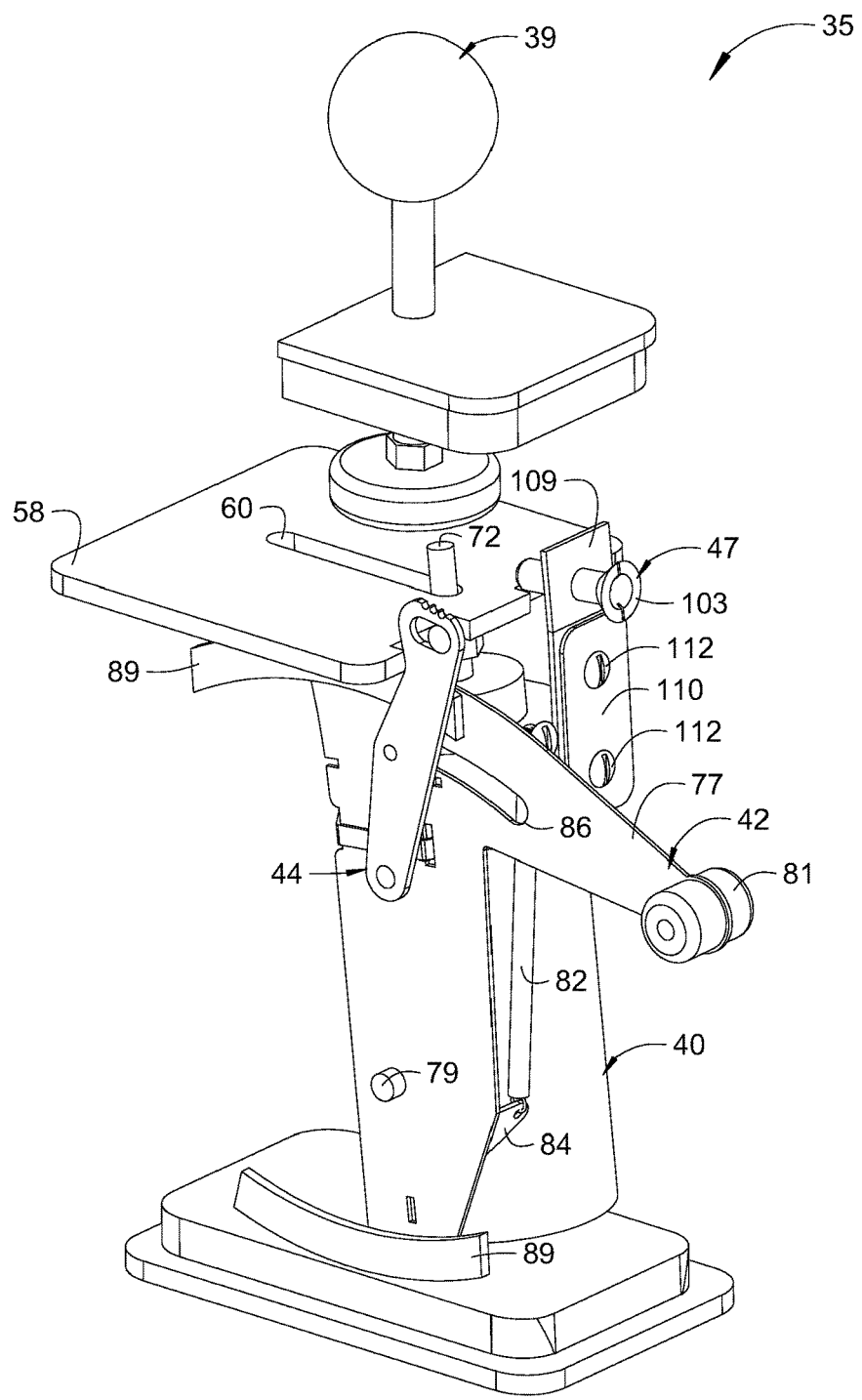
FIG. 4 is a perspective view of the device of FIG. 1 with a housing removed to show the relative orientation of internal components, in accordance with various aspects of the present invention.

With reference to FIG. 4, the actuation lever assembly includes actuation lever 77 that is pivotally mounted to housing 49 via an actuation lever pivot 79, a lever knob 81 to facilitate a user in gripping and moving the lever arm, and a spring 82 that biases the lever arm to a retraced position. As the actuation lever extends parallel and in close proximity to one side of the housing, the narrow-wall configuration of the actuation lever and the housing allow for a very compact design that is not significantly wider than router assembly 40. Such compact design provides for a woodworking device having a very small footprint and may thus be used by hobbyist and/or prosumer woodworkers even in the smallest of shop areas and/or garages.

In various embodiments, actuation lever 77 is plate steel or sheet metal, cut and bent into shape. For example, the profile of the lever may be cut by laser or water-jet, and a lower spring mount 84 bent at an angle to the remainder of the lever, as shown in FIG. 4. Again, various metal-bending technologies may be used to bend the lower spring mount, including but not limited to those discussed in my above-mentioned '259, '450, 511, '869, '390, '390, '639, and '874 patents. Alternatively, the profile and shape of the actuation lever may be formed by stamping, molding, and/or other suitable fabrication means. In addition, the actuation lever may be formed of other suitable materials, including but not limited to other metals, plastics, composites, and/or other suitable materials.

The actuation lever includes a travel slot 86 extending therethrough (see, e.g., FIG. 12), which slot defines the limits of motion of the actuation lever relative to the housing, as will be discussed in greater detail below. In particular, the terminal or end walls of the travel slot serve as abutments that are monolithically formed with the actuation lever, which abutments will limit motion of the actuation lever as discussed below. One will appreciate that other suitable abutment configurations may be utilized including, but not limited to tabs bent out from the actuation lever, pins extending from the actuation lever, shoulders extending from the actuation lever, and/or other suitable abutment means. For example, the actuation lever may include abutment surfaces 87, 87' cut into the profile of actuation lever 77 (see FIG. 13), in which the forward abutment 87 simply abuts against an inside surface of the housing to limit forward motion of the actuation lever to its retracted position, and the rearward abutment 87' abuts against stop pin 95' to limit rearward motion of the actuation lever to its deployed position. In such embodiments, the stop aperture 96' in housing 49' is aligned with stop pin 95' as shown in FIG. 14.

Figure 14:
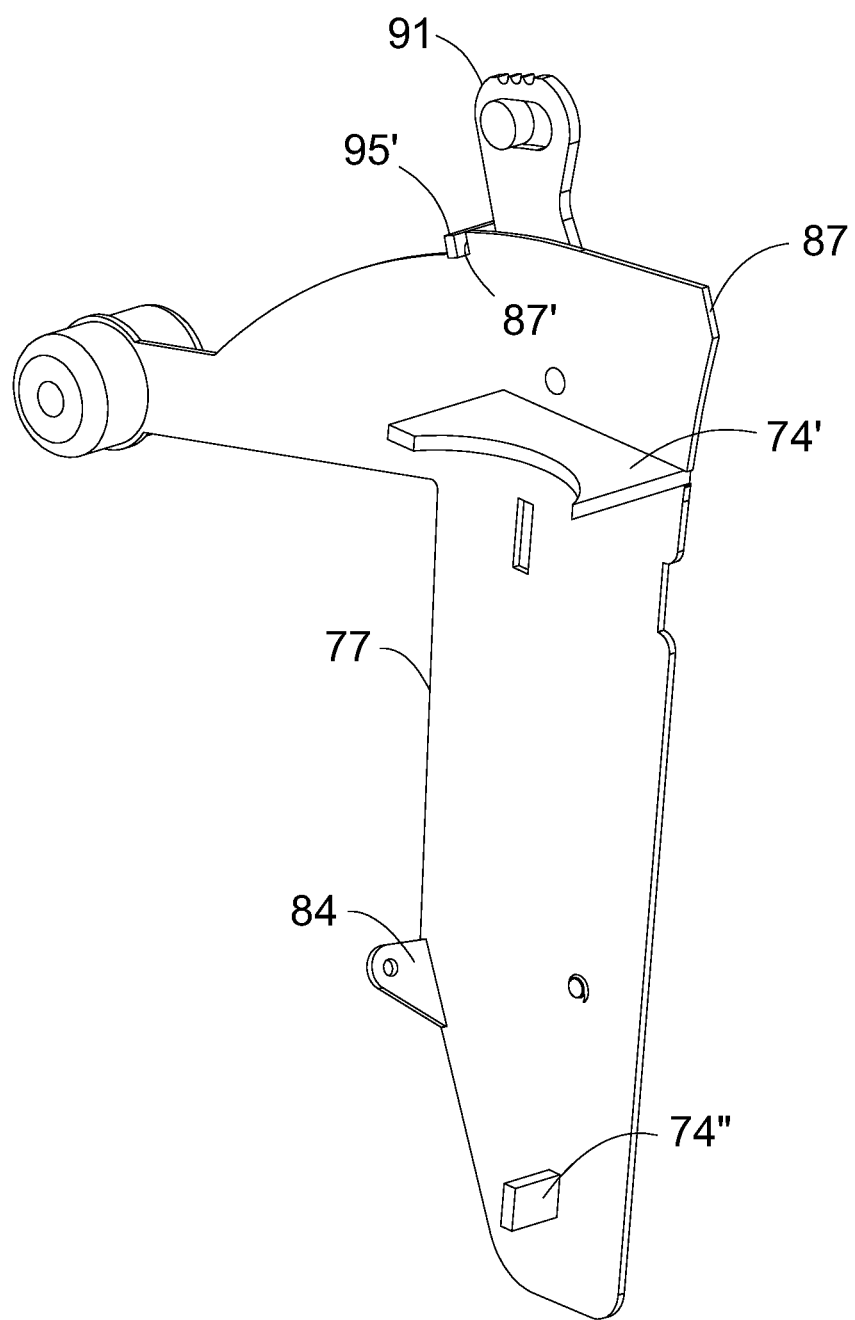
FIG. 14 is a rear perspective view of another housing of similar to that device of FIG. 5 used with the router and actuation lever of FIG. 13, in accordance with various aspects of the present invention.

With continued reference to FIG. 14, in various embodiments actuation lever pivot 79 may be welded or otherwise affixed to actuation lever 77 and tapped to receive a screw or bolt. Such configuration allows the actuation lever to be pulled toward an inner surface of the housing such that the activation lever may be "preloaded" against the slide strips.

Figure 9:
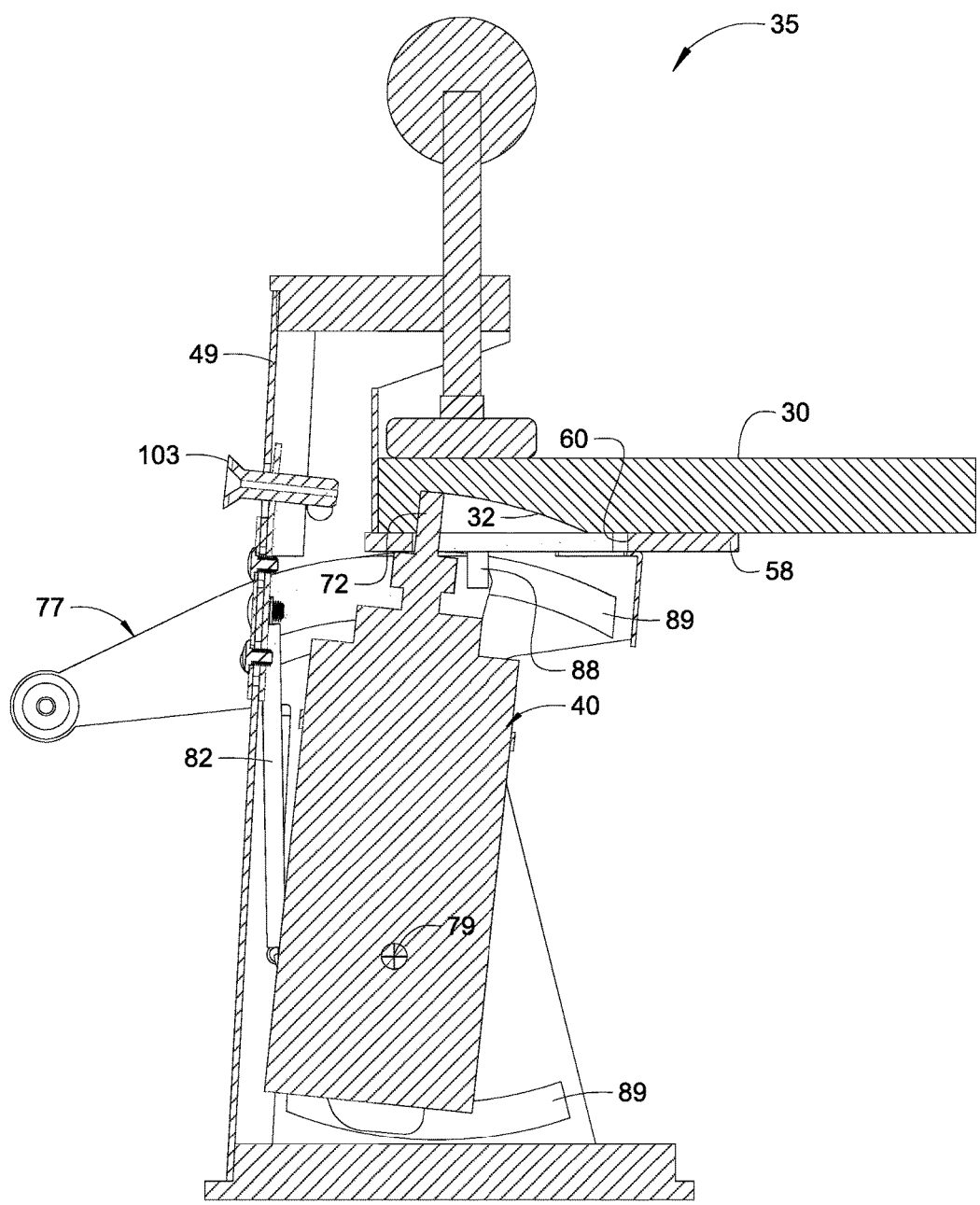
FIG. 9 is a central cross-sectional view of the device of FIG. 1 with a workpiece mounted thereon, and with the actuation lever and router assembly in a deployed position, in accordance with various aspects of the present invention.

With reference to FIG. 9, a guide bushing 88 is affixed to the underside of worktop 58 to minimize flexing of the actuation lever 77 and otherwise provide lateral structural support to the actuation lever. The guide bushing may be formed of a low-friction plastic material, however, one will appreciate that bearings and other suitable bushing means may be utilized. Also, one or more low-friction slide strips 89 are mounted between the activation lever and the housing to minimize sliding friction between the two. In various embodiments, a pair of semi-circular plastic strips are mounted on an inside surface of the housing, however, one will appreciate that various low-friction surfaces may be utilized including, but not limited to adhesive backed UHMW strips (e.g., Slick Strips by ePlastics), polyethylene tapes, acetal resin sheets (e.g., Delrin® sheets by Dupont), and the like.

Figure 7:
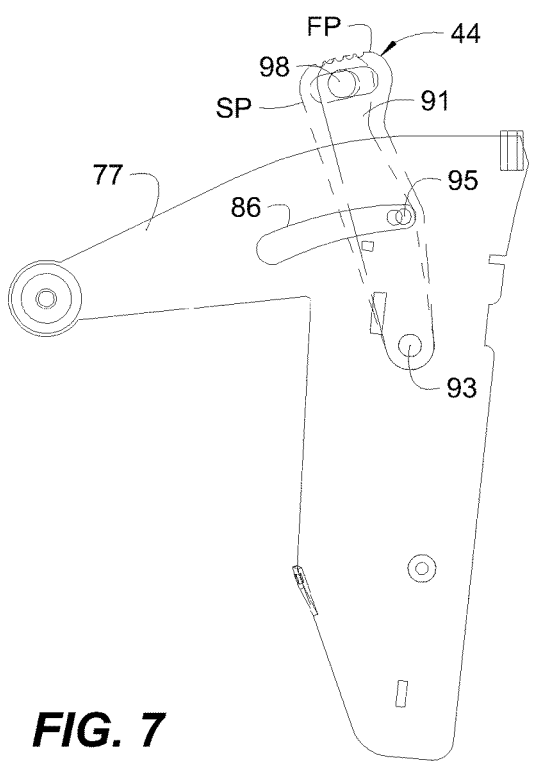
FIG. 7 is a side view of actuation and stop levers of the device of FIG. 1 with the stop lever in a first position and in a second position shown in phantom, in accordance with various aspects of the present invention.

With reference to FIG. 7, the stop lever assembly includes a stop lever 91 pivotally mounted on housing 49 (see FIG. 1) by a stop lever pivot 93, a stop pin 95 extending from the stop lever through a stop pin aperture 96 in the housing, and into a travel slot 86 in actuation lever 77 across at least a portion of thickness T of the actuation lever to ensure that the stop pin abuts against the actuation lever and limit the range of motion of the actuation lever. The position of the stop pin relative to the housing may be adjusted by pivoting stop lever 91 from a first position FP to a second position SP shown in FIG. 7, and may be fixed in the desired position by a stop fastener 98. In various embodiments, the stop fastener is a screw that is threadedly engaged with housing. Also in various embodiments, the stop lever is provided with adjustment indicia 100 in the form of a plurality of recesses that may be aligned with datum indicia 102 in the form of a datum hole extending through housing 49 (see, e.g., FIG. 1 and FIG. 5). One will appreciate that the indicia may be reversed such that the datum indicia is located on the stop lever, and the adjustment indicia on the housing. Such indicia allow an operator to reliably and repeatedly adjust the stop lever to a desired position to provide a desired distance from the workpiece edge to the rounded terminal end of pocket 32. For example, positioning stop lever 91 in the first position FP stops movement of the router assembly sooner thus limiting the sweep of router bit 72 to provide a wider "web" (i.e., the distance from the workpiece edge to the terminal end of the pocket). And positioning stop lever 91 in the second position SP allows greater movement of the router assembly thus allowing increased sweep of the router bit to provide a narrower "web".

Figure 10:
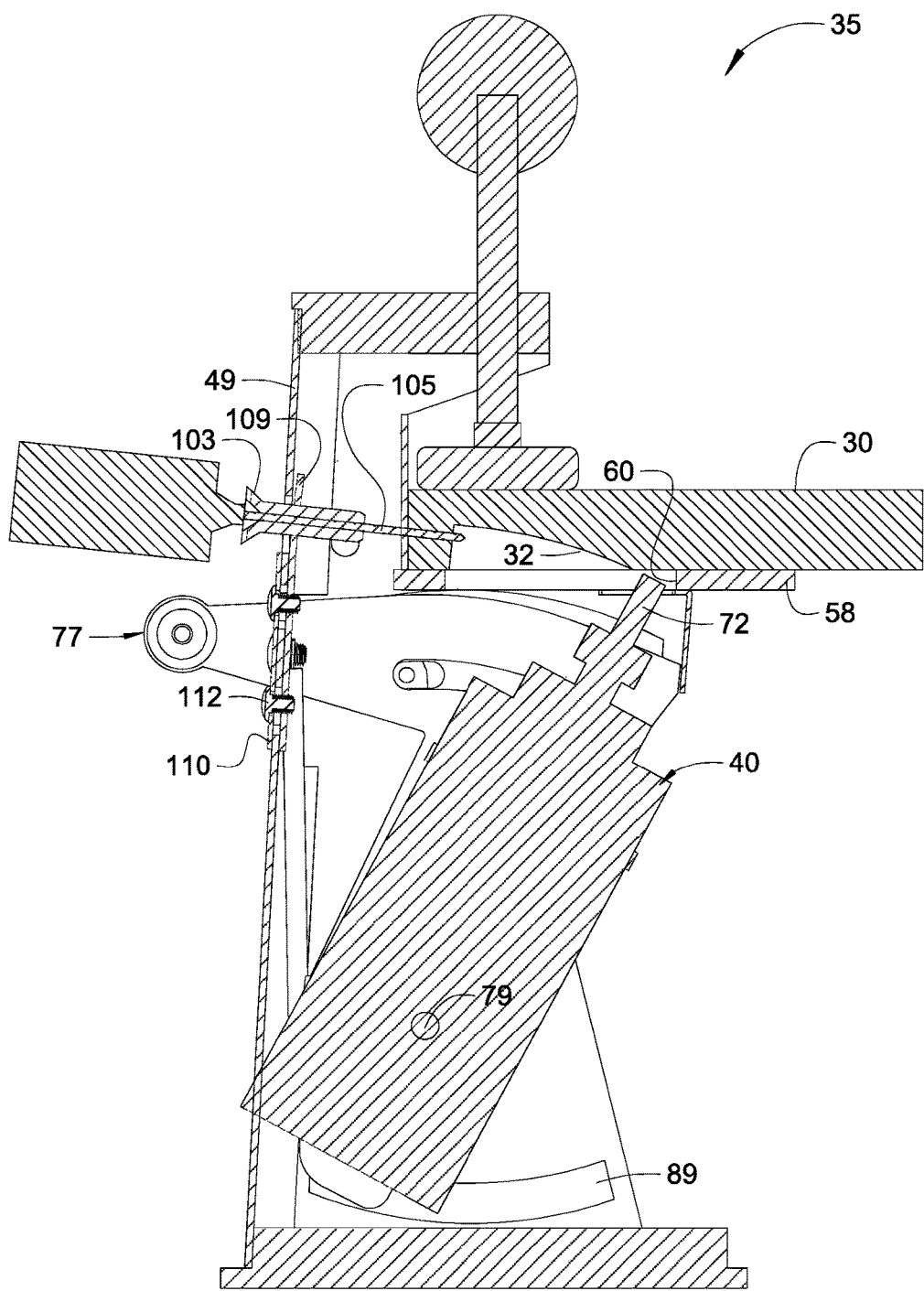
FIG. 10 is a central cross-sectional view of the device of FIG. 1 with the workpiece mounted thereon and the actuation lever and router assembly in the retracted position, and with a drill assembly forming a bore in the workpiece, in accordance with various aspects of the present invention.

With reference to FIG. 4, the drill guide assembly includes a collar 103 for positioning and directing a drill bit 105 with respect to the workpiece 30 clamped down on worktop 58 (see, e.g., FIG. 10). In particular, the collar may be adjusted such that the drill bit forms a bore 33 extending from the edge of the workpiece to the rounded terminal end of pocket 32.

To allow adjustment, the collar extends through a collar aperture 107 of the housing (see FIG. 5) and is threadedly engaged with guide support 109 to allow axial movement toward and away from the workpiece thus allowing a user to finely adjust the depth that the drill bit may penetrate the workpiece. One will appreciate that a user may initially adjust the amount the drill bit may penetrate the workpiece with the use of an adjustable drill bit stop collar mounted on the drill bit, or by adjusting the amount the drill bit is inserted into a hand drill chuck in an otherwise conventional manner such that the drill bit stop collar or the hand drill chuck abuts against collar 103 at a desired position thereby limiting penetration of the drill bit into the workpiece. The user may then use collar 103 to finely adjust the amount of penetration by screwing the collar further into, or out from guide support 109.

The drill guide assembly further includes a locking plate 110 and locking screws 112 which extend through locking screw apertures 114, 114' (see FIG. 5) and are threadedly engaged with guide support 109 such that the locking plate and the guide support sandwich housing 49 (see, e.g., FIG. 8) and can releasably secure the guide support to the housing by tightening the locking screws. The locking screw apertures are oversized with respect to the locking screws thus allowing the guide support to move up-and-down and side-to-side relative to the housing, and thus allowing such adjustment of collar 103 with respect to housing and to the workpiece clamped down on the worktop. With reference to FIG. 5, upper locking screw aperture 114 has square profile that is significantly larger than the respective locking screw and smaller in profile than guide support 109 and locking plate 110, while lower locking screw aperture 114' has a vertically elongated profile that is also smaller than the guide support and locking plate. Such configuration allows the drill guide assembly to slide up-and-down and side-to-side with respect to the housing while the screws are slightly loosened.

Turning now to FIG. 8 through FIG. 11, one exemplary method of forming a screw pocket in a workpiece in accordance various aspects of the present invention can now be described.

Figure 8:
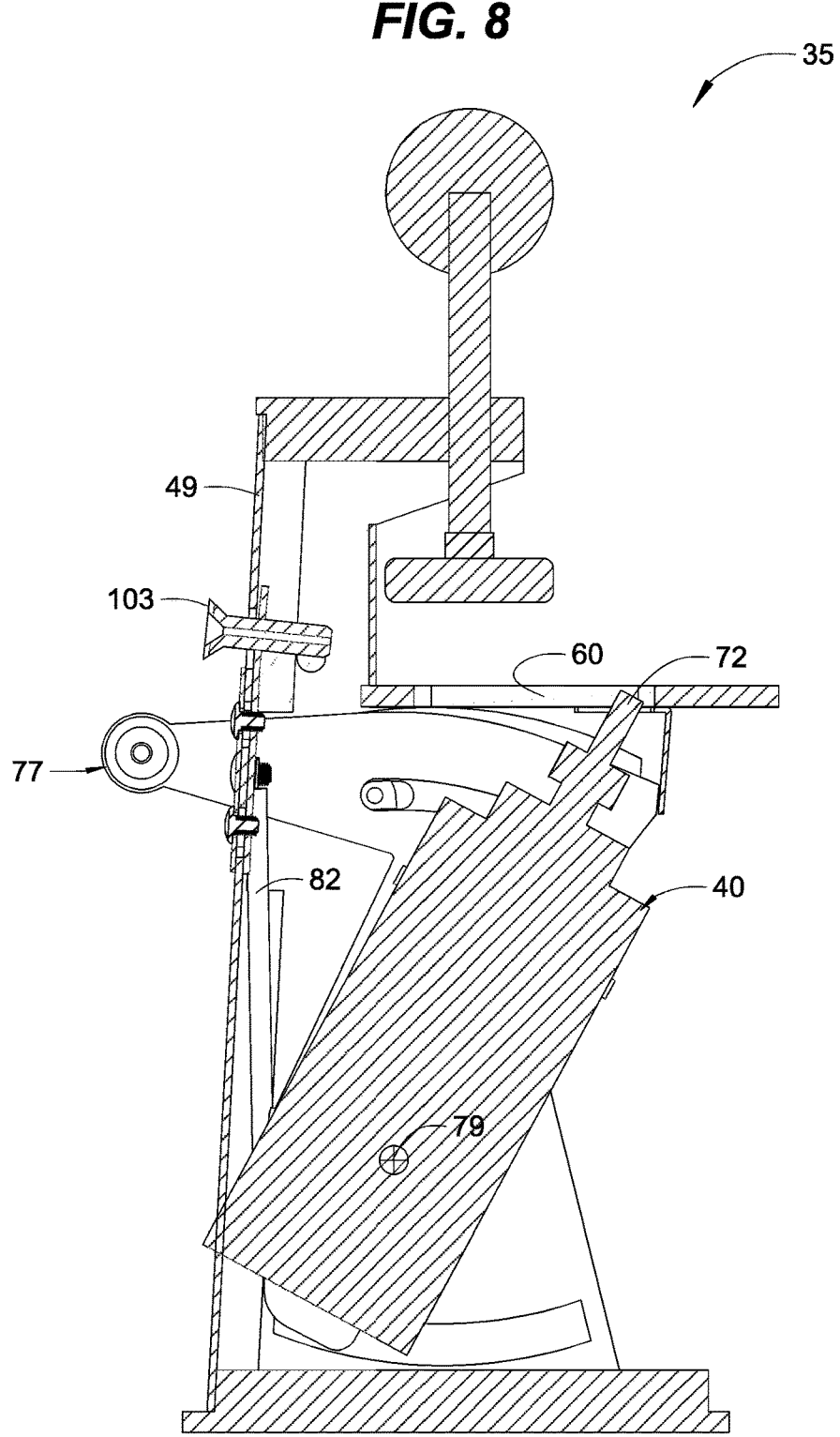
FIG. 8 is a central cross-sectional view of the device of FIG. 1 showing the actuation lever and a router assembly in a retracted position, in accordance with various aspects of the present invention.

FIG. 8 is a cross-sectional view of pocket-cutting device 35 showing the router assembly 40 and the actuation lever 77 in a retracted position.

FIG. 9 is a cross-sectional view showing a workpiece 30 clamped down on worktop 58 of pocket-cutting device 35, with the router assembly 40 and the actuation lever 77 in a deployed position having routed pocket 32 in the work piece.

FIG. 10 is a cross-sectional view showing a workpiece 30 still clamped down on worktop 58 of pocket-cutting device 35, with the router assembly 40 and the actuation lever 77 in a retraced position thus allowing clearance for drill bit 105 to form bore 33 in the workpiece extending from the edge of the workpiece and to the routed pocket 32.

Figure 11:
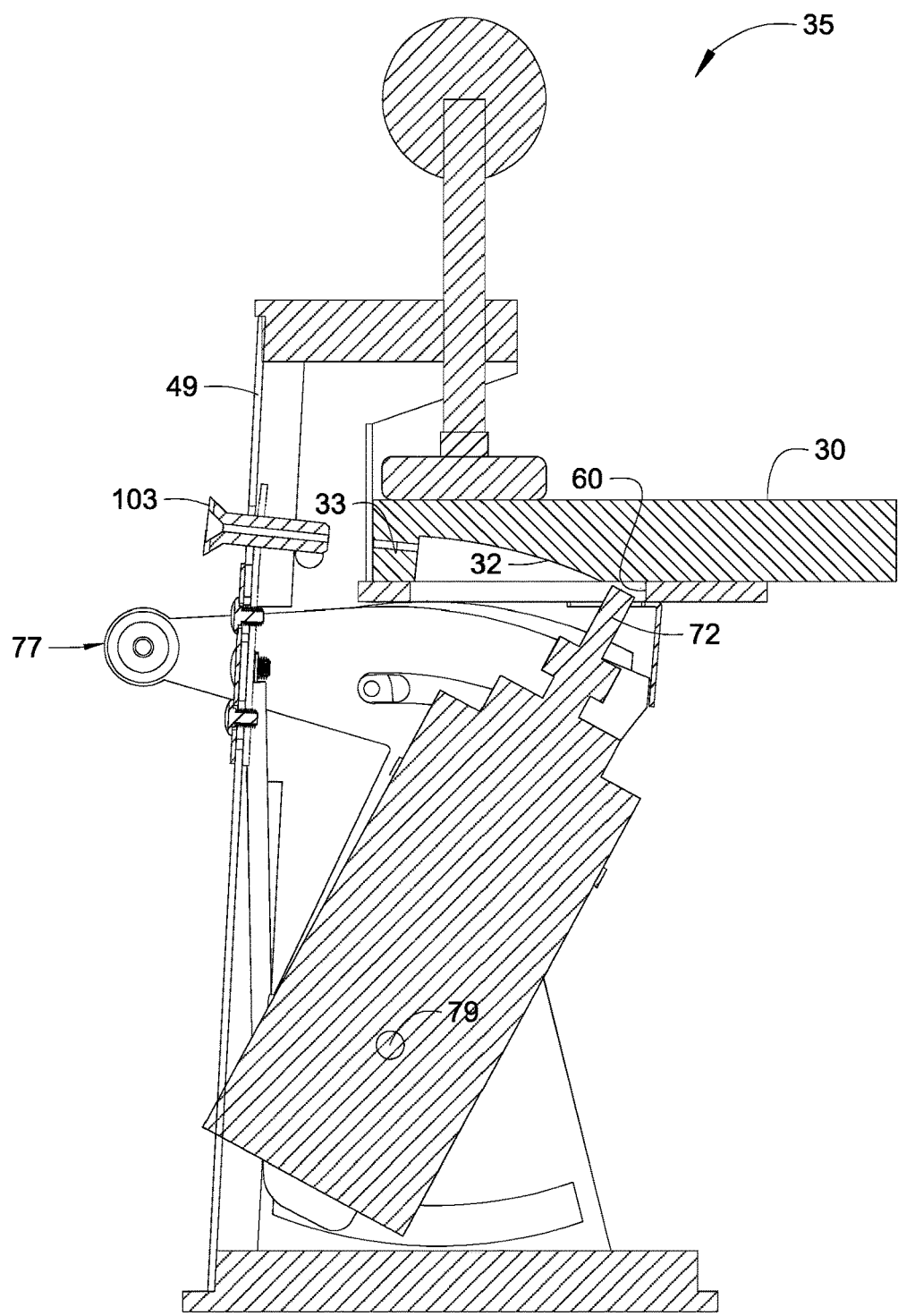
FIG. 11 is a central cross-sectional view of the device of FIG. 1 with the workpiece mounted thereon and the actuation lever and a router assembly still in their retracted position, and the drill assembly removed showing the bore in the workpiece, in accordance with various aspects of the present invention.

FIG. 11 is a cross-sectional view similar to FIG. 10 but with the drill bit removed from and thus showing bore 33 in workpiece 30 extending from the edge of the workpiece and to the routed pocket 32.

In operation and use, if the bore is not aligned as desired within the workpiece, the user may loosen locking screws 112, reposition the drill guide assembly 47 as desired, and retighten the locking screws. Once positioned and tightened down, the drill guide assembly allows the user to perform successive pocket forming operations with repeatable and precise positioning of bore 33. Similarly, if the "web" thickness is not as desired, the user may loosen stop fastener 98, reposition stop lever 91 as desired (i.e., to limit motion of actuation lever 77 as desired), and retighten the stop fastener. Once positioned and tightened down, the stop lever assembly allows the user to perform successive pocket forming operations with repeatable and precise dimensioning of the pocket web.

In various embodiments, as shown in FIG. 15 to FIG. 19, work clamp assembly 39a may be provided with a quick-release camming assembly 116 for quickly and repeatably securing similarly dimensioned workpieces 30 to worktop 58. Various aspects of work clamp assembly 39a are similar to the work clamp assembly described, and like reference numerals have been used to describe like components of both the work clamp assembly and the pocket-cutting device.

The clamp actuator 67a may be threadably mounted on a clamp frame 117 that is configured to move up and down relative to the worktop 58. For example, the clamp frame may have a generally U-shaped configuration, and a lower portion of the clamp frame may be pivotally mounted to body 37a by tabs 119 that extend through the rear wall of the body. The clamp frame may be biased upwardly by a clamp-frame spring 121. For example, the clamp-frame spring may be fastened to the clamp frame 117 by a suitable fastener and have a rearward leg 123 that curves and extends downwardly through an opening in the clamp frame and against the inner rear wall of body 37a. The clamp-frame spring may also include diverging arms 121' that extend forwardly and outwardly to provide a wear surface, as will be evident below.

Figure 19:
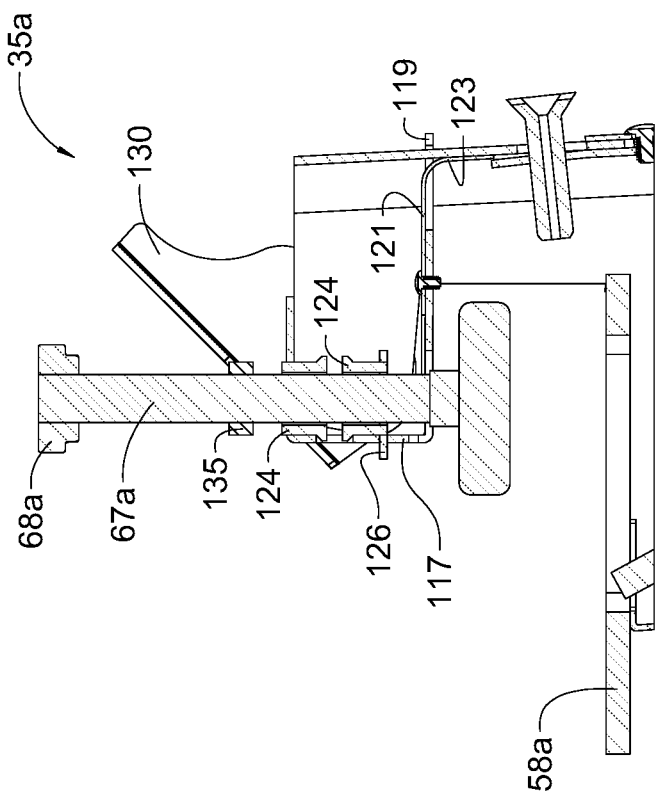
FIG. 19 is partial crossectional view of the device of FIG. 15 taken along line 18-18 in FIG. 18.
Figure 18:
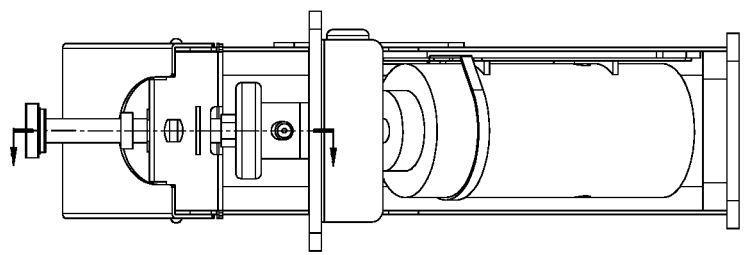
FIG. 18 is a front view of the device of FIG. 15 with a cam lever shown in an upward release position with the workpiece removed.

In such embodiments, clamp actuator 67a is threadably supported on clamp frame 117. As shown in FIG. 19, the clamp actuator is threadably secured to the clamp frame by a pair of flange nuts 124, an upper one oriented upright and extending through the top of the clamp frame, and a lower one oriented upside-down and extending through an axial stop 126 that extends horizontally through the front of the clamp frame. Hexagonal openings are provided in the top and the axial support to rotationally affix the flange nuts with respect to the clamp frame, while a flange opening 128 is provided in the front of the axial support to abut against the flange nuts and axially affix the flange nuts with respect to the clamp frame.

Figure 15:
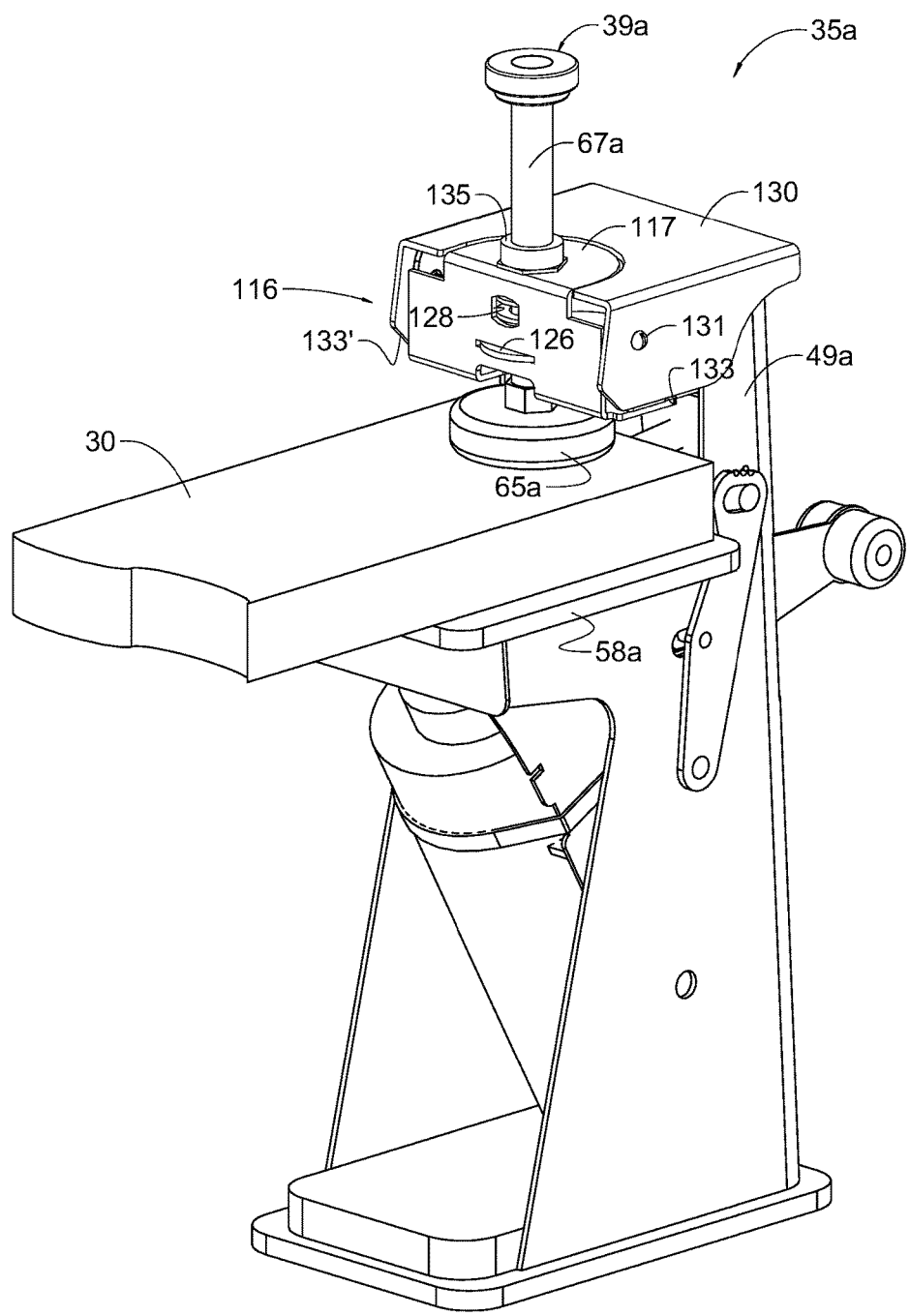
FIG. 15 is a perspective view of another exemplary adjustable pocket-cutting device in accordance with various aspects of the present invention, which devices is substantially similar to that shown in FIG. 1 but including a quick-release camming assembly securing a workpiece to a worktop.
Figure 16:
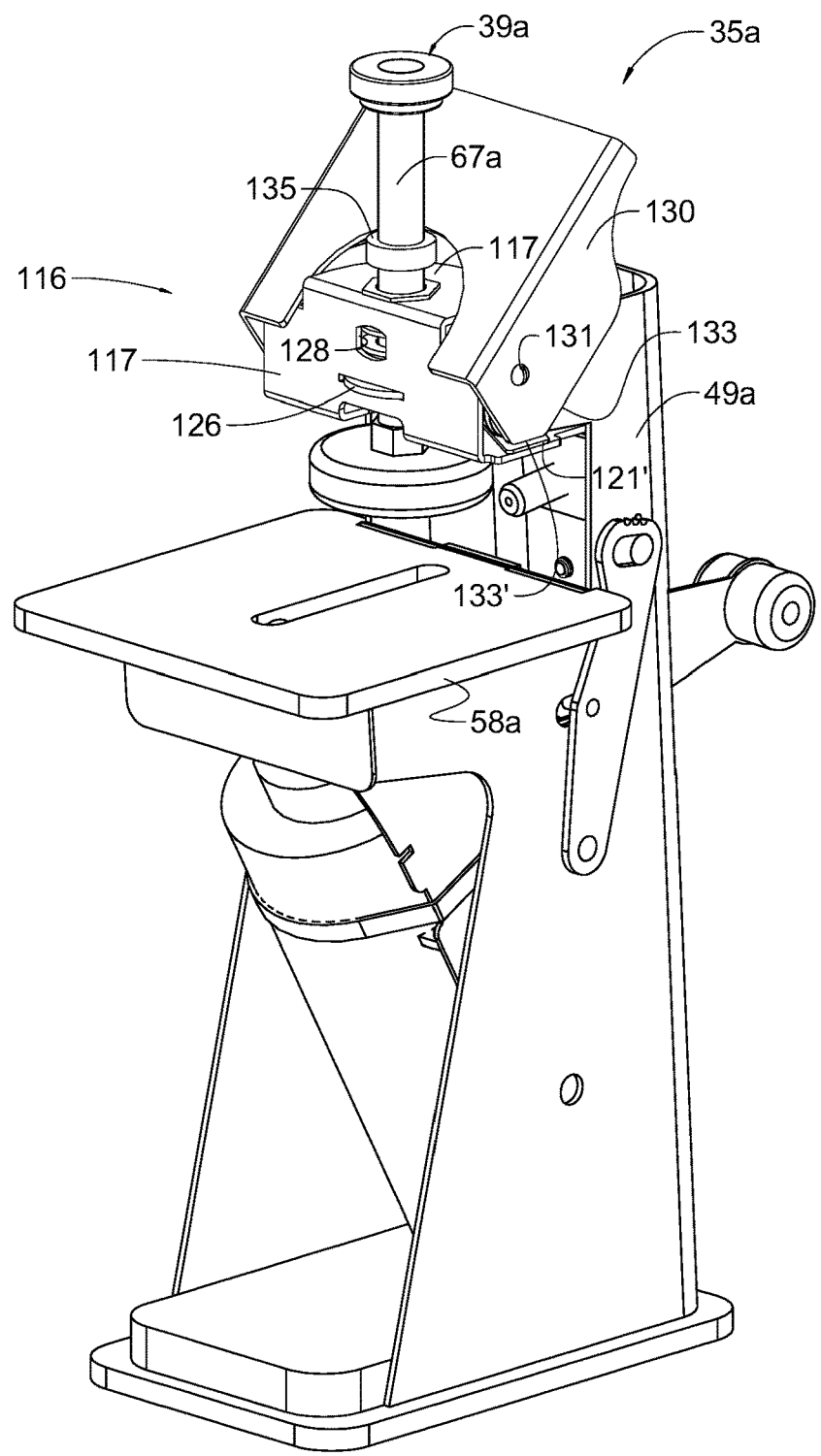
FIG. 16 is another perspective view of the device of FIG. 15 with a cam lever shown in an upward release position with the workpiece removed.

A cam lever 130 is pivotally mounted on body 37a by screws 131, and the cam lever is provided with a camming surfaces 133, 133', with the former abutting downwardly against the clamp frame when the cam lever is in its downward engaged position as shown in FIG. 15, and the latter abutting downwardly against the clamp frame when the cam lever is in its upward released position as shown in FIG. 16. One will appreciate that the radial distance of camming surface 133 is greater than that of camming surface 133', such that when cam lever 130 is moved upwardly, the smaller radial distance of camming surface 133' allows clamp-frame spring 121 to bias clamp frame 117 upwardly and thereby release workpiece 30 from the worktop 58.

Figure 17:
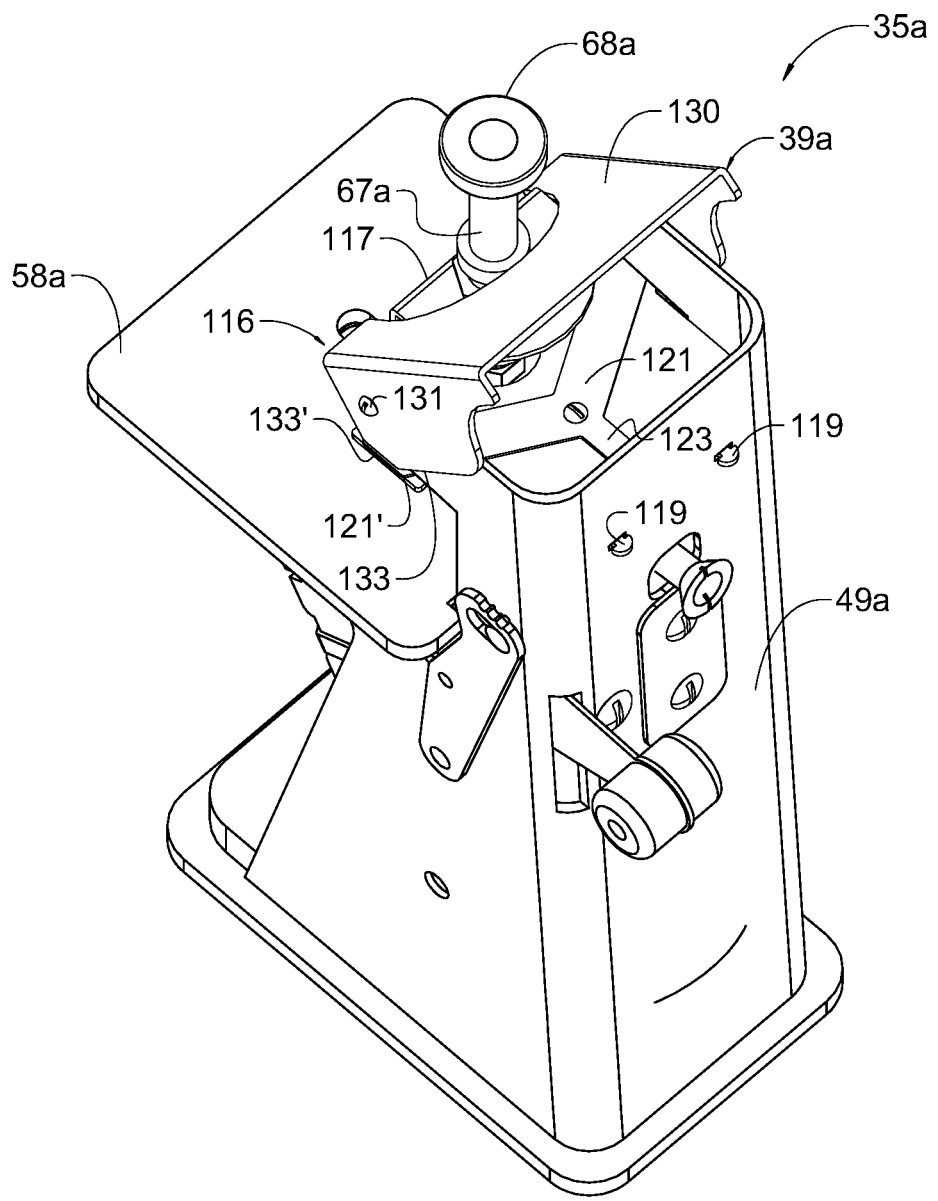
FIG. 17 is rear perspective view of the device of FIG. 15 with a cam lever shown in an upward release position with the workpiece removed.

As can be seen in FIG. 17, clamp-frame spring 121 includes diverging arms 121' that extend forwardly and outwardly. As the clamp-frame spring is preferably formed of hardened steel, or other material suitably stiff to provide a spring-effect, the clamp-frame spring is also suitable for providing a wear surface between moving parts. As best seen FIG. 15 and FIG. 16, ends of the diverging arms extend between clamp frame 117 and cam lever 130. Since the clamp-frame spring is formed of hardened steel, it provides a useful wear surface to lessen wear between the clamp frame and the cam surface.

The configuration of the illustrated camming assembly is particularly well suited for fabrication from sheet metal—each of the axial support, clamp-frame spring, clamp frame, and cam lever may be simply cut form sheet metal, and the latter bent into shape in a similar manner as described above with respect to the housing. One will appreciate that various other means may be utilized to movably mount the clamp frame to the housing and cam the clamp frame into engagement with the workpiece.

In operation and use, pocket-cutting device 35a is used in substantially the same manner as pocket-cutting device 35 discussed above. Instead of tightening workpiece 30 to the worktop solely by tightening the clamp knob by hand, clamp foot 65a may be brought in close proximity to the top surface of a workpiece by turning clamp knob 68a and locked in place by rotating lock nut down 135 against the upper flange nut 124 of clamp support 117, and clamp foot 65a may then be securely engaged against the workpiece by moving cam lever 130 into its downward engaged position shown in FIG. 15. To release the workpiece from the worktop, one need only move the cam lever into its upward released position shown in FIG. 16. A subsequent workpiece having the same thickness may then be positioned and secured against the worktop by simply moving cam lever 130 into its downward engaged position. Alternatively, if a subsequent workpiece has a different thickness, one may simply unscrew lock nut 135 away from the clamp support and then turn clamp knob 68a to account for the different thickness and then use cam lever 130 as described above to secure the workpiece.

For convenience in explanation and accurate definition in the appended claims, the terms "upper", "lower", "inside" and other relative terms are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously, many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An adjustable pocket-cutting device for routing a pocket in a workpiece, said adjustable pocket-cutting device comprising:

a body including a housing pivotally supporting a router assembly, a worktop mounted on the body for supporting the workpiece, wherein the housing includes an edge stop for receiving an edge of the workpiece to position the workpiece on the worktop;

a router assembly including a router having a router bit for routing the pocket in the workpiece positioned on the worktop;

an actuation lever assembly including an actuation lever pivotally mounted on the housing at an actuation lever pivot, the actuation lever includes a router mount for supporting the router thereon, wherein the router bit sweeps through a slot in the worktop and into the work piece clamped against the worktop as the router assembly pivots from a retracted position to a deployed position;

stop lever assembly for adjustably limiting the sweep of the router bit into the work clamped to the worktop, the stop lever assembly including a stop lever adjustably mounted to the housing at a stop lever pivot, a stop pin extending from the stop lever through a clearance opening in the housing and across a portion of the thickness of the actuation lever, wherein the stop pin abuts against an abutment surface of the actuation lever to limit the sweep of the router bit as the router assembly pivots to the deployed position.

2. An adjustable pocket-cutting device according to claim 1, further comprising a work clamp assembly for clamping the workpiece against the worktop when positioned on the worktop.

3. An adjustable pocket-cutting device according to claim 2, wherein the work clamp assembly includes a clamp frame that is movable with respect to the housing, and a cam lever that is pivotally mounted on the housing, wherein the cam lever biases the clamp frame toward the workpiece supported on the worktop when in an engaged position, and the cam lever releases the clamp frame from the workpiece when in a released position.

4. An adjustable pocket-cutting device according to claim 1, wherein the stop lever assembly further includes a fastener for adjustably securing the stop lever relative to the housing.

5. An adjustable pocket-cutting device according to claim 1, wherein the stop lever assembly further includes pivoting indicia and the housing includes stationary indicia to facilitate alignment of the stop lever relative to the housing to accurately limit the sweep of the router bit.

6. An adjustable pocket-cutting device according to claim 1, further comprising a drill guide assembly for adjustably aligning a drill bit path relative to the sweep of the router bit, the drill guide assembly including a support adjustably mounted to the housing, and a collar mounted on the support, the collar having a through bore for receiving and positioning a drill bit.

7. An adjustable pocket-cutting device according to claim 4, wherein the drill guide assembly further includes a lock for adjustably securing the support to the housing.

8. An adjustable pocket-cutting device according to claim 4, wherein the collar is axially adjustable relative to the support.

9. An adjustable pocket-cutting device according to claim 1, wherein the stop pin extends from the stop lever through a clearance opening in the housing and into a travel slot of the actuation lever, wherein the stop pin abuts against a proximal end of the travel slot to limit the sweep of the router bit as the router assembly pivots to the deployed position.

10. An adjustable pocket-cutting device for routing a pocket in a workpiece, said adjustable pocket-cutting device comprising:

a body including a housing, a worktop mounted on the body for supporting the workpiece, wherein the housing includes an edge stop for receiving an edge of the workpiece to position the workpiece on the worktop;

a router assembly including a router having a router bit for routing the pocket in the workpiece positioned on the worktop;

an actuation lever assembly including an actuation lever pivotally mounted on the housing at an actuation lever pivot, the actuation lever includes a router mount for pivotally supporting a router assembly relative to the actuation lever pivot such that a router bit sweeps through a slot in the worktop and into a work piece clamped against the worktop as the router assembly pivots from a retracted position to a deployed position;

stop lever assembly for adjustably limiting the sweep of the router bit into the work clamped to the worktop, the stop lever assembly including a stop lever adjustably mounted to the housing at a stop lever pivot, a stop pin extending from the stop lever through a clearance opening in the housing and into a travel slot of the actuation lever, wherein the stop pin abuts against a proximal end of the travel slot to limit the sweep of the router bit as the router assembly pivots to the deployed position.

11. An adjustable pocket-cutting device according to claim 10, further comprising a work clamp assembly for clamping the workpiece against the worktop when positioned on the worktop.

12. An adjustable pocket-cutting device according to claim 11, wherein the work clamp assembly includes a clamp frame that is movable with respect to the housing, and a cam lever that is pivotally mounted on the housing, wherein the cam lever biases the clamp frame toward the workpiece supported on the worktop when in an engaged position, and the cam lever releases the clamp frame from the workpiece when in a released position.

13. An adjustable pocket-cutting device according to claim 10, wherein the stop lever assembly further includes a fastener for adjustably securing the stop lever relative to the housing.

14. An adjustable pocket-cutting device according to claim 10, wherein the stop lever assembly further includes pivoting indicia and the housing includes stationary indicia to facilitate alignment of the stop lever relative to the housing to accurately limit the sweep of the router bit.

15. An adjustable pocket-cutting device according to claim 10, further comprising a drill guide assembly for adjustably aligning a drill bit path relative to the sweep of the router bit, the drill guide assembly including a support adjustably mounted to the housing, and a collar mounted on the support, the collar having a through bore for receiving and positioning a drill bit.

16. An adjustable pocket-cutting device according to claim 15, wherein the drill guide assembly further includes a lock for adjustably securing the support to the housing.

17. An adjustable pocket-cutting device according to claim 15, wherein the collar is axially adjustable relative to the support.

18. An adjustable pocket-cutting device according to claim 10, wherein the stop pin extends from the stop lever through a clearance opening in the housing and into a travel slot of the actuation lever, wherein the stop pin abuts against a proximal end of the travel slot to limit the sweep of the router bit as the router assembly pivots to the deployed position.

\* \* \* \* \*